(12) United States Patent
Togami et al.

(10) Patent No.: US 6,373,652 B1
(45) Date of Patent: *Apr. 16, 2002

(54) RECORDING AND/OR REPRODUCING APPARATUS HAVING TAPE GUIDING MEMBER

(75) Inventors: Mikio Togami; Akira Tomitaka, both of Kanagawa-ken (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 791 days.

(21) Appl. No.: 08/606,601

(22) Filed: Feb. 26, 1996

(30) Foreign Application Priority Data

Mar. 3, 1995 (JP) .............................................. 7-044055

(51) Int. Cl.$^7$ ............................................. G11B 15/665
(52) U.S. Cl. ....................................................... 360/85
(58) Field of Search ........................................... 360/85

(56) References Cited

U.S. PATENT DOCUMENTS

| | | | | |
|---|---|---|---|---|
| 5,315,460 A | * | 5/1994 | Takeda et al. | 360/85 |
| 5,361,180 A | * | 11/1994 | Yamabuchi et al. | 360/85 |
| 5,459,626 A | * | 10/1995 | Lee et al. | 360/85 |

* cited by examiner

Primary Examiner—Robert S. Tupper
(74) Attorney, Agent, or Firm—Robin, Blecker & Daley

(57) ABSTRACT

In a recording and/or reproducing apparatus, at least one of tape guiding members provided for wrapping a tape around a rotary drum pulls out the tape from a cassette before a cassette mounting member is moved in a direction of approaching the rotary drum and, after that, the tape guiding members and the cassette mounting member are moved in directions of approaching the rotary drum.

12 Claims, 4 Drawing Sheets

RECORDING AND/OR REPRODUCING APPARATUS HAVING TAPE GUIDING MEMBER

BACKGROUND OF THE INVENTION

1. Field of the Invention

This invention relates to a recording and/or reproducing apparatus, such as a VTR or the like, and more particularly to a recording and/or reproducing apparatus arranged to load a tape-shaped recording medium therein by pulling the tape-shaped recording medium out of a cassette while causing the cassette to approach a rotary drum.

2. Description of the Related Art

Various methods have been known for making compact an apparatus, such as a VTR, arranged to record and/or reproduce information on or from a magnetic tape contained in a cassette by using a rotary drum unit having magnetic heads mounted thereon. For example, the apparatus has been configured as shown in FIGS. 5 and 6 for reduction in size.

Referring to FIGS. 5 and 6, a cassette mounting chassis 2 (hereinafter referred to as a slide chassis) on which a cassette 7 is to be mounted is provided separately from a main chassis 1 on which a rotary drum unit 3 having a rotary drum and a fixed drum supporting the rotary drum is disposed. The slide chassis 2 is arranged to be slidable with respect to the main chassis 1 between a position where the slide chassis 2 is located away from the rotary drum unit 3 as shown in FIG. 5 and a position where the slide chassis 2 is located close to the rotary drum unit 3 as shown in FIG. 6. Recording or reproduction on or from a magnetic tape 8 is performed in the state where a part of or the whole of the rotary drum unit 3 is located within an opening part 7a of the cassette 7. Further, there are provided a capstan 4, a tape guiding member 5 for pulling out the magnetic tape 8 on the tape entrance side of the rotary drum unit 3, a tape guiding member 6 disposed on the tape exit side of the rotary drum unit 3.

The tape loading action of the apparatus is as follows. After the cassette 7 is mounted on the slide chassis 2 as shown in FIG. 5, the tape 8 is being pulled out from the opening part 7a of the cassette 7 by the movement of the tape guiding members 5 and 6. At the same time, the slide chassis 2 is being moved in a direction of approaching the rotary drum unit 3. Then, as shown in FIG. 6, the rotary drum unit 3 is relatively inserted into the opening part 7a of the cassette 7 by the sliding motion of the slide chassis 2, and the magnetic tape 8 is wrapped around the circumferential surface of the rotary drum unit 3 by the movement of the tape guiding members 5 and 6.

With the apparatus arranged as described above, in cases where the opening part 7a of the cassette 7 is not wide enough and where the rotary drum unit 3 is set in a deviating position due to the relative sizes or positions of the rotary drum unit 3 and the rotor part of a capstan motor 9, the moving paths of the tape guiding members 5 and 6 might come to interfere, in part or in their entirety, with the rotary drum unit 3 during a tape loading operation in which the movement of the tape guiding members 5 and 6 and the movement of the slide chassis 2 are performed at the same time. This problem is manifest particularly in a case where the apparatus is intended to be made compact.

To solve this problem, it has been developed, as shown in FIG. 7, to move the tape guiding members 5 and 6 to their tape-loading completing positions in advance before the slide chassis 2 is moved and, after that, to move the slide chassis 2, so that the tape guiding members 5 and 6 can be prevented from interfering with the rotary drum unit 3, for example, as disclosed in Japanese Laid-Open Patent Application No. HEI 5-217256.

However, the prior art arrangement as shown in FIG. 7 has presented another problem as follows. Since the tape guiding members 5 and 6 are to be moved in advance to their tape-loading completing positions, the length of a tape path obtained immediately after the tape guiding members 5 and 6 has been moved, i.e., before the commencement of the sliding motion of the slide chassis 2 (see FIG. 7), becomes longer than the length of a tape path obtained when the tape loading is completed after the slide chassis 2 has been moved (see FIG. 6).

The tape 8, therefore, slackens while the slide chassis 2 is in the process of moving. The slackened tape 8 then tends to come off the flange parts of guide posts of the tape guiding members 5 and 6 and other tape restricting parts such as a lead part of the fixed drum of the rotary drum unit 3, etc., and thus might be fouled or damaged. Although the tape 8 can be prevented from slackening by taking the tape 8 up by rotating a reel while the slide chassis 2 is in the process of moving, such arrangement, however, necessitates a complex tape loading action.

Another problem of the prior art example cited above resides in a long period of time required from the commencement to the end of the tape loading action, as the timing of the motion of the tape guiding members 5 and 6 differs from that of the motion of the slide chassis 2.

SUMMARY OF THE INVENTION

It is an object of this invention to provide a recording and/or reproducing apparatus which is made compact in size and which is capable of smoothly carrying out a tape loading action.

It is another object of this invention to provide a recording and/or reproducing apparatus arranged to prevent interference of tape guiding members with a rotary drum and yet to be capable of preventing a tape from slackening during the process of tape loading.

It is a further object of this invention to provide a recording and/or reproducing apparatus arranged to curtail a length of time required for tape loading as well as to attain the above-stated objects.

To attain these objects, an apparatus arranged to pull out, from a cassette, a tape contained in the cassette and to record and/or reproduce information on or from the tape, comprises a rotary drum having a head for recording and/or reproducing information on or from the tape, a cassette mounting member on which the cassette is mountable and which is movable between a first position located away from the rotary drum and a second position located close to the rotary drum, and first and second tape guiding members arranged to pull out the tape from the cassette mounted on the cassette mounting member and to wrap the tape around the rotary drum, wherein at least the first tape guiding member pulls out the tape from the cassette before the cassette mounting member begins to move from the first position to the second position, and, after that, the first tape guiding member and the cassette mounting member move in directions of approaching the rotary drum.

These and other objects and features of this invention will become apparent from the following detailed description of an embodiment thereof taken in conjunction with the accompanying drawings.

DETAILED DESCRIPTION OF THE PREFERRED EMBODIMENT

Figure 1:
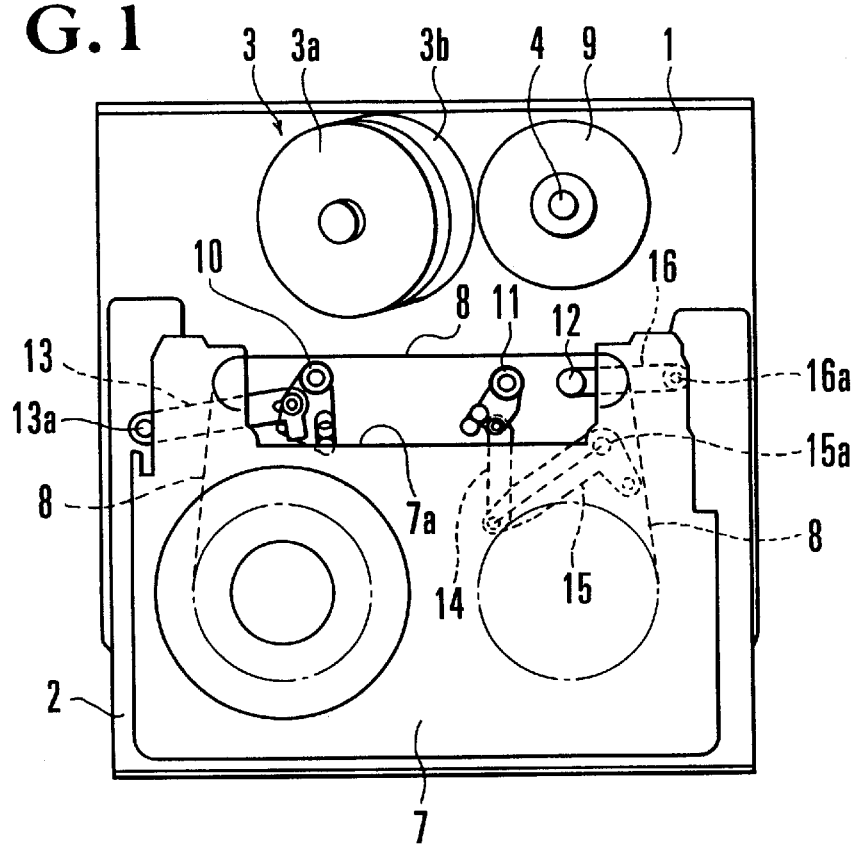
FIG. 1 is a plan view showing a state in which a cassette is mounted on a VTR which is an embodiment of this invention.
Figure 2:
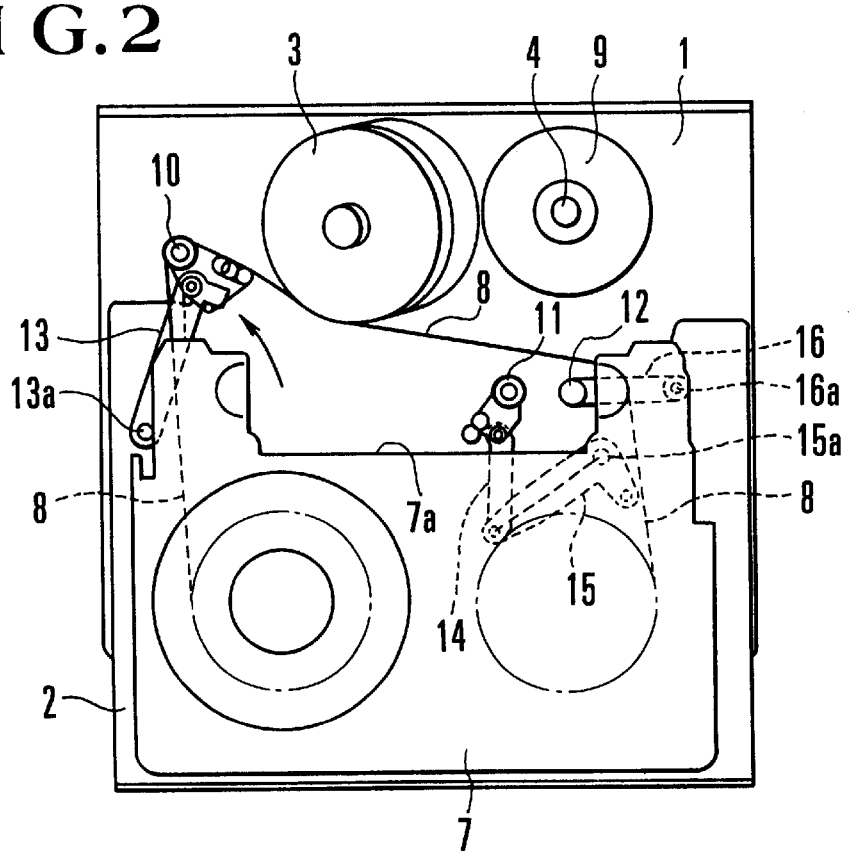
FIG. 2 is a plan view showing a state in which a tape guiding member has retreated in the embodiment.
Figure 3:
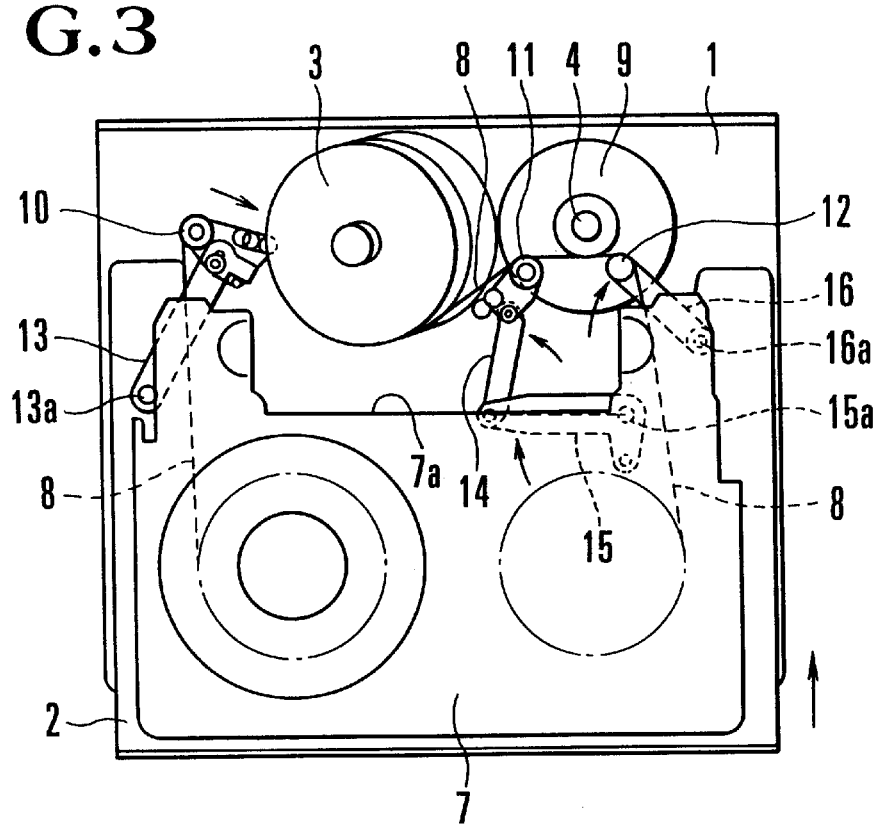
FIG. 3 is a plan view showing a state in which the tape loading is in process in the embodiment.
Figure 4:
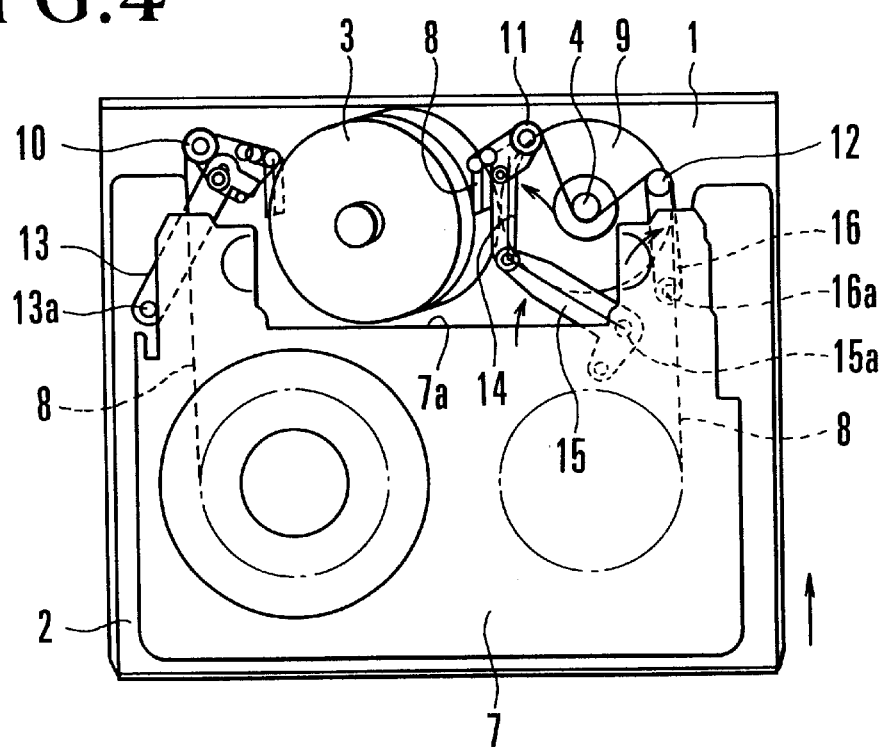
FIG. 4 is a plan view showing a state in which the tape loading has been completed.
Figure 5:
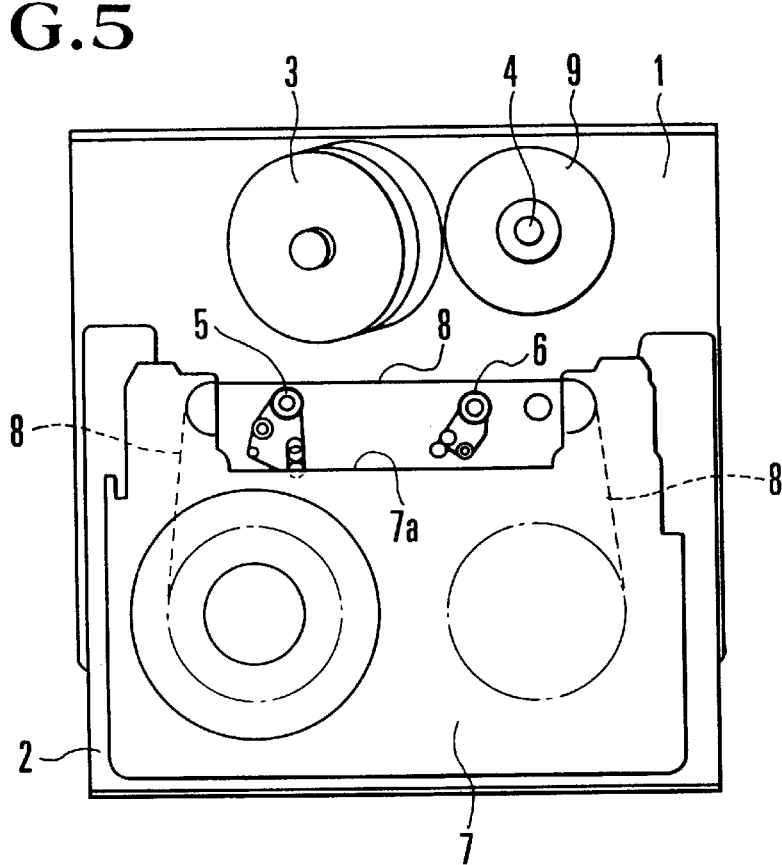
FIG. 5 is a plan view showing a state in which a cassette is mounted on the conventional VTR.
Figure 6:
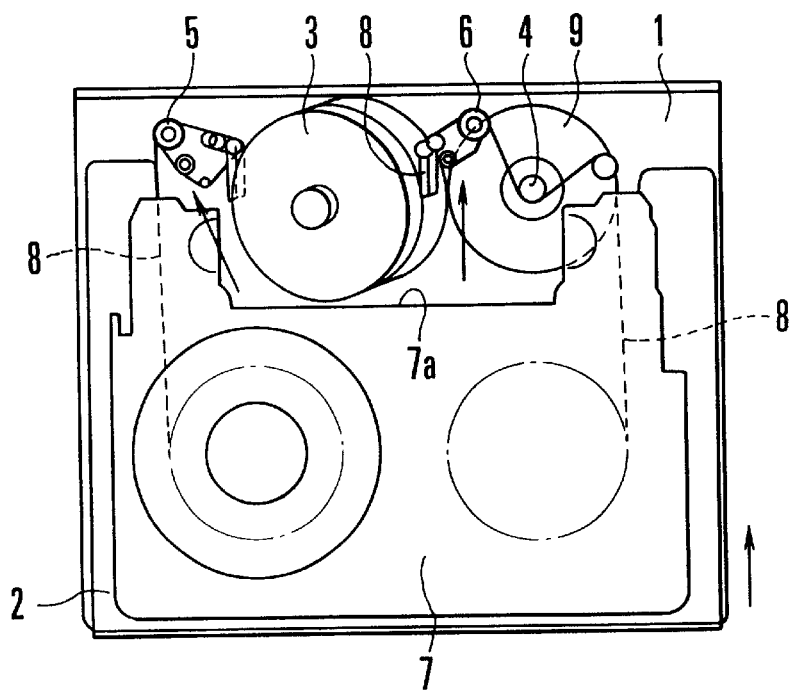
FIG. 6 is a plan view showing a state in which the tape loading has been completed in the conventional VTR.

A VTR to which this invention is applied as an embodiment thereof is described below with reference to FIGS. 1 to 4. FIG. 1 is a plan view showing a state in which a cassette is mounted on the VTR. FIG. 2 is a plan view showing a state in which a tape guiding member has retreated in the VTR. FIG. 3 is a plan view showing a state in which the tape loading is in process in the VTR. FIG. 4 is a plan view showing a state in which the tape loading has been completed in the VTR.

In each of FIGS. 1 to 4, a main chassis is denoted by reference numeral 1. A slide chassis 2 which serves as a cassette mounting member is arranged to be movable back and forth over the main chassis 1. A rotary drum unit 3 is disposed on the main chassis 1 and is composed of a rotary drum 3a and a fixed drum 3b supporting the rotary drum 3a. The rotary drum 3a is provided with a plurality of magnetic heads. A capstan 4 is driven by a capstan motor 9 disposed on the main chassis 1. A cassette 7 has an opening part 7a. A magnetic tape 8 is employed as a tape-shaped recording medium. A tape guiding member 10 is arranged on the tape entrance side of the rotary drum unit 3. A tape guiding member 11 is arranged on the tape exit side of the rotary drum unit 3. Another tape guiding member 12 is arranged to form a tape path on the tape take-up side of the cassette 7.

The tape guiding member 10, which is composed of a plurality of guide posts and a base which supports these guide posts, is supported on the fore end of an arm 13. The arm 13 is disposed on the slide chassis 2 to be swingable about a shaft 13a. The tape guiding member 11, which is composed of a plurality of guide posts and a base which supports these guide posts, is disposed on the fore end of an arm 14. The arm 14 is swingably connected to another arm 15. The arm 15 is disposed on the slide chassis 2 to be swingable about a shaft 15a. The tape guiding member 12 is composed of a guide post which is supported on the fore end of an arm 16. The arm 16 is disposed on the slide chassis 2 to be swingable about a shaft 16a. The arms 13, 14, 15 and 16 are arranged to be driven by a drive mechanism (not shown) which is mainly composed of a loading motor.

For reduction in size of the VTR, the rotary drum unit 3 is disposed deviating toward the tape entrance side on the main chassis 1 in such a way as to avoid interference with a rotor part of the capstan motor 9. Therefore, if the tape guiding members 10 and 11 are allowed to begin to move simultaneously with the commencement of the sliding motion of the slide chassis 2, the moving path of the tape guiding member 10 on the tape entrance side would come to interfere with the rotary drum unit 3.

Therefore, the tape guiding member 10 on the tape entrance side is arranged to be moved from its loading start position within the opening part 7a of the cassette 7 to its retreat position outside of the opening part 7a before the slide chassis 2 begins to be moved, as shown in FIG. 2.

In the arrangement described above, the cassette 7 is first mounted on the slide chassis 2 by being inserted into a cassette holder (not shown) attached to the slide chassis 2, when the slide chassis 2 is in a back-moved position located away from the rotary drum unit 3. With the cassette 7 mounted on the slide chassis 2 in this manner, a front lid of the cassette 7 is opened by a cassette lid opening mechanism (not shown) attached to the slide chassis 2, and the VTR takes a loading start state. Under this condition, the tape guiding members 10, 11 and 12 are in their loading start positions within the opening part 7a of the cassette 7.

When the tape loading is started, the tape guiding member 10 on the tape entrance side, whose moving path would interfere with the rotary drum unit 3 if the tape loading is performed in the conventional manner, is moved from the loading start position to the retreat position, where the tape guiding member 10 never interferes with the rotary drum unit 3, as shown in FIG. 2, while pulling out the tape 8 by the swinging motion of the arm 13.

After that, as shown in FIG. 3, at the same time that the slide chassis 2 is moved by the loading motor in a direction of approaching the rotary drum unit 3 from the back-moved position, the tape guiding member 10 is moved in a direction of approaching the rotary drum unit 3 from the retreat position by the swinging motion of the arm 13. The tape guiding member 11 is also moved in a direction of pulling out the tape 8 from its loading start position by the swinging motion of the arms 14 and 15. Further, the tape guiding member 12 also begins to move in a direction of pulling out the tape 8 by the swinging motion of the arm 16.

Then, as shown in FIG. 4, the slide chassis 2 is moved to its forth-moved position and, at the same time, the tape guiding members 10 and 11 are moved to their loading completing positions. The tape 8 is then wrapped around the circumferential surface of the rotary drum unit 3 and the tape loading action comes to an end. In addition, on the tape take-up side, the tape 8 is spread further sideways to hook the tape 8 on the capstan 4.

With the tape loading action completed, the tape 8 is pressed against the capstan 4 by means of a pinch roller (not shown) and is caused to travel by the rotation of the reel and the rotation of the capstan 4. With the tape 8 thus caused to travel, the head provided on the rotary drum 3a performs recording and/or reproduction on or from the tape 8 as desired.

Since the tape guiding member 10 is moved to the retreat position in advance at the commencement of the tape loading, the moving path of the tape guiding member 10 is effectively prevented from interfering with the rotary drum unit 3. Further, the amount of movement of the tape guiding member 10 required for moving to the retreat position before the sliding movement of the slide chassis 2 (see FIG. 2) is smaller than the amount of movement to the loading completing position (see FIG. 7). Besides, since, when the tape guiding member 10 is moved to approach the rotary drum unit 3 as shown in FIG. 3, the tape guiding members 11 and 12 act to pull out the tape 8 from the cassette 7, the tape 8 never slackens during the tape loading due to the simultaneous movement of the tape guiding members 10, 11 and 12 and the slide chassis 2. The tape 8 thus can be prevented from being fouled or damaged due to a slacken state.

Further, the tape guiding member 10 can be moved to the retreat position in a very short length of time, and, after the tape guiding member 10 has retreated, the tape guiding members 10 and 11 are moved to their loading completing positions simultaneously with the sliding motion of the slide chassis 2. The arrangement of the embodiment, therefore, is able to make a length of time necessary for the tape loading shorter than in a case where the slide chassis 2 is moved after both the tape guiding members 10 and 11 are moved to their loading completing positions.

Figure 7:
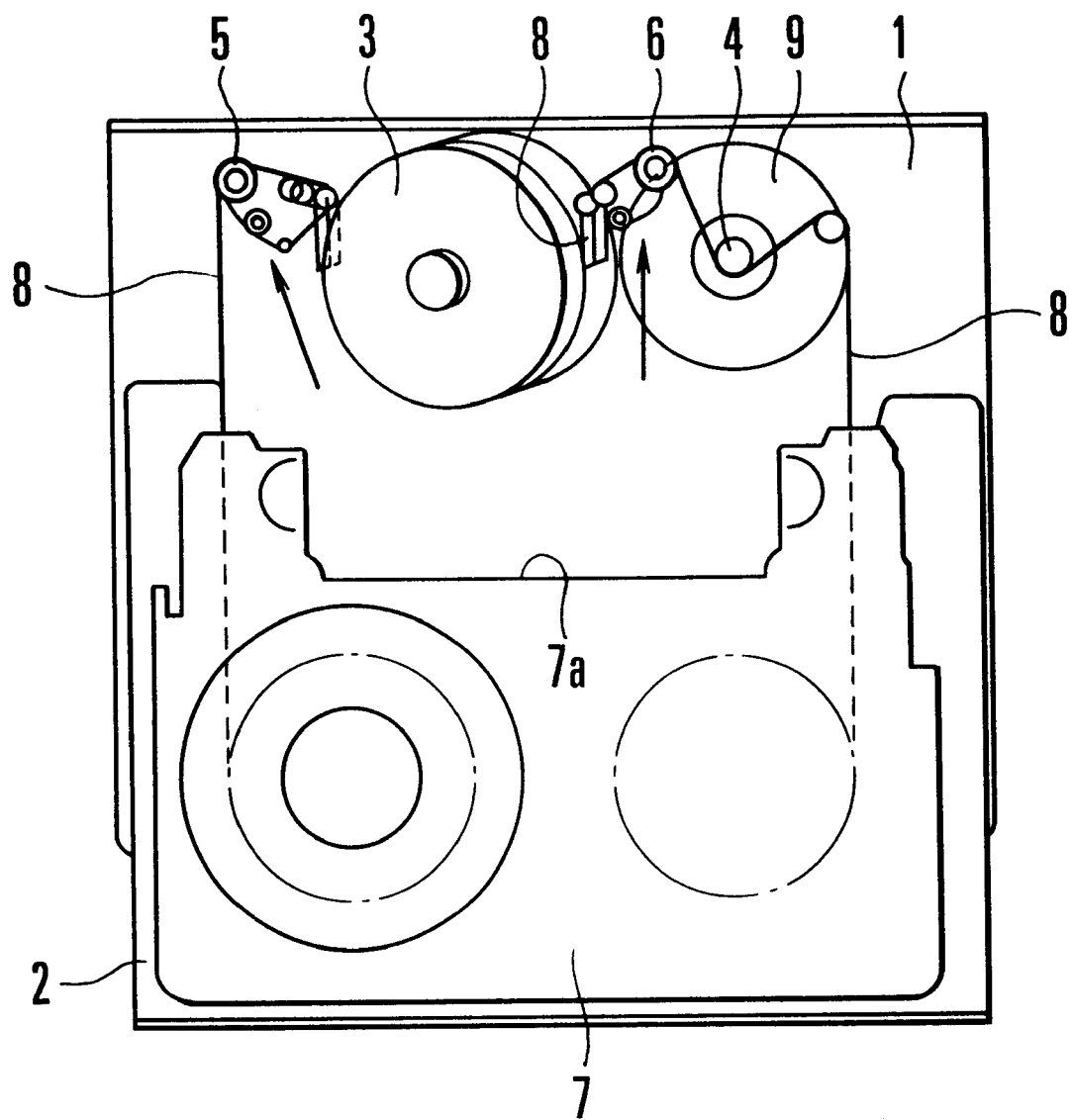
FIG. 7 is a plan view showing a state in which tape guiding members are moved in advance to their loading completing positions.

In the case of the prior art arrangement which has been described in the foregoing with reference to FIG. 7, the tape guiding members 5 and 6 are moved to the loading completing positions in advance before the slide chassis 2 are moved. That arrangement, however, makes it necessary to provide on the main chassis 1 a substantial loading mechanism for supporting and moving the tape guiding members 5 and 6, and also necessitates a greater moving amount. The arrangement of this embodiment, on the other hand, requires only a small amount of moving the tape guiding member 10 to the retreat position, and the tape guiding members 10 and 11 after that are moved simultaneously with the slide chassis 2, so that the tape guiding members 10 and 11 can be movably disposed on the slide chassis 2. It is particularly advantageous that the use of a swingable-arm type loading mechanism in which the arms 13 and 14 (15) are arranged to support the tape guiding members 10 and 11, as in the case of this embodiment, permits simplification of the loading mechanism and reduction in space required for the loading mechanism.

While one embodiment of this invention has been described by way of example in the foregoing, this invention is not limited to this particular embodiment. Various effective modifications and applications are possible on the basis of the technological concept of this invention. For example, while the tape guiding member on the tape entrance side of the rotary drum unit is arranged to retreat beforehand in the case of this embodiment, the tape guiding member on the tape exit side or both the tape guiding members may be arranged to retreat beforehand. Even in a case of both the tape guiding members are caused to retreat, the required amount of moving them is of course smaller than an mount of moving them to their loading completing positions.

This embodiment is arranged, as described above, to cause the tape guiding member, the moving path of which would interfere with the rotary drum unit if it is moved concurrently with the movement of the cassette mounting member, to be moved beforehand to a retreat position to effectively avoid its interference with the rotary drum unit, so that the arrangement contributes to reduction in size of the apparatus.

With the tape guiding member moved to a retreat position which requires a less amount of movement than the loading completing position, the tape (a tape-shaped recording medium) never slackens when the tape loading is performed after the retreat. Therefore, the tape-shaped recording medium can be prevented from becoming foul or damaged due to a slacken state without recourse to such a complex loading action as to take up the tape-shaped recording medium by rotating a reel while the tape loading is in process. This enhances the reliability of the apparatus. Further, the arrangement of moving the tape guiding members concurrently or simultaneously with the cassette mounting member after one of the tape guiding members is moved to the retreat position enables the tape loading action to be accomplished in a shorter period of time than an arrangement of separately moving them. That also enhances the operability of the apparatus.

As apparent from the foregoing description, the arrangement of the embodiment gives a salient advantage particularly in the case of a compact recording and/or reproducing apparatus where moving tape guiding members tend to interfere with other members.

What is claimed is:

1. An apparatus arranged to pull out, from a cassette, a tape contained in the cassette and to record and/or reproduce information on or from the tape, comprising:

(a) a rotary drum having a head for recording and/or reproducing information on or from the tape;

(b) a cassette mounting member on which the cassette is mountable and which is movable between a first position located away from said rotary drum and a second position locked close to said rotary drum;

(c) first and second tape guiding members arranged to pull out the tape from the said cassette mounted on said cassette mounting member and to wrap the tape around said rotary drum; and (d) control means for controlling said cassette mounting member and said first and second tape guiding members to perform a tape loading operation, said control means moving said first tape guiding member to pull out the tape from the cassette before a movement of said cassette mounting member from the first position to the second position, and then moving said first tape guiding member and said cassette mounting member in directions of approaching said rotary drum.

2. An apparatus according to claim 1, wherein said first tape guiding member is located at a tape entrance side of said rotary drum when the tape engages said drum over said preselected portion of the circumference of the drum.

3. An apparatus according to claim 1, wherein said first tape guiding member is rotatably supported on said cassette mounting member.

4. An apparatus according to claim 3, wherein said cassette mounting member has a swinging member which is swingably disposed thereon, and wherein said first tape guiding member is disposed on said swinging member.

5. A method of wrapping a recording tape contained in a cassette over a preselected portion of the circumference of a rotary drum having a head for recording and/or reproducing information on or from the tape when the tape is wrapped around the drum over the preselected portion of the circumference of the drum, comprising the steps of:

(a) disposing the cassette on a cassette mounting member and supporting the cassette mounting member for movement between a first position located away from said rotary drum and a second position located close to said rotary drum;

(b) supporting at least one tape guiding member for rotational movement on said cassette mounting member;

(c) while maintaining said cassette mounting member in said first position, rotating said tape guiding member in a first rotational sense to wrap said tape around said drum to an extent less than said preselected portion of the circumference of the drum; and then (d) moving said cassette mounting member from said first position to said second position while rotating said tape guiding member in a second sense opposite to said first sense.

6. A method according to claim 5 including the further steps of supporting a further tape guiding member for rotational movement on said cassette mounting member and initiating engagement of said further tape guiding member with said tape during said movement of said cassette mounting member from said first position to said second position.

7. An apparatus arranged to receive a cassette and to record and/or reproduce information on or from a tape withdrawn from the cassette, comprising:
  (a) a rotary drum having a head for recording and/or reproducing information on or from the tape when the tape is wrapped around the drum over a preselected portion of the circumference of the drum;
  (b) a cassette mounting member on which the cassette is mountable and which is supported for movement between a first position located away from said rotary drum and a second position located close to said rotary drum; and
  (c) first and second tape guiding members mounted on said cassette mounting member and supported for movement to wrap the tape around said rotary drum over said preselected portion of the circumference of the drum,
  wherein at least said first tape guiding member is supported for first sense rotational movement relative to said cassette mounting member to a first position in engagement with said tape wherein said tape engages said drum over less than said preselected portion of the circumference of the drum and for second sense rotational movement opposite to said first sense rotational movement to a second position in engagement with said tape wherein said tape engages said drum over said preselected portion of the circumference of the drum.

8. An apparatus according to claim 7, wherein said first tape guiding member is located at a tape entrance side of said rotary drum when the tape engages said drum over said preselected portion of the circumference of the drum.

9. An apparatus according to claim 7, wherein said first tape guiding member is rotatably supported on said cassette mounting member.

10. An apparatus according to claim 9, wherein said cassette mounting member has a swinging member which is swingably disposed thereon, and wherein said first tape guiding member is disposed on said swinging member.

11. A method of wrapping a recording tape contained in a cassette over a preselected portion of the circumference of a rotary drum having a head for recording and/or reproducing information on or from the tape when the tape is wrapped around the drum over the preselected portion of the circumference of the drum, comprising the steps of:
  (a) disposing the cassette on a cassette mounting member and supporting the cassette mounting member for movement between a first position located away from said rotary drum and a second position located close to said rotary drum;
  (b) supporting at least one tape guiding member for rotational movement on said cassette mounting member;
  (c) while maintaining said cassette mounting member in said first position, rotating said tape guiding member in a first rotational sense to wrap said tape around said drum to an extent less than said preselected portion of the circumference of the drum; and then
  (d) moving said cassette mounting member from said first position to said second position while rotating said tape guiding member in a second sense opposite to said first sense.

12. A method according to claim 11 including the further steps of supporting a further tape guiding member for rotational movement on said cassette mounting member and initiating engagement of said further tape guiding member with said tape during said movement of said cassette mounting member from said first position to said second position.

* * * * *

UNITED STATES PATENT AND TRADEMARK OFFICE
CERTIFICATE OF CORRECTION

PATENT NO.   : 6,373,652 B1
DATED        : April 16, 2002
INVENTOR(S)  : Mikio Togami et al.

It is certified that error appears in the above-identified patent and that said Letters Patent is hereby corrected as shown below:

<u>Column 6,</u>
Line 13, delete "locked" and insert -- located --.
Lines 27-33, delete in their entirety and insert the following:
-- 2. An apparatus according to claim 1, wherein said first tape guiding member is located on a tape entrance side of said rotary drum when the tape is wrapped around said rotary drum.
   3. An apparatus according to claim 1, wherein said first tape guiding member is movably disposed on said cassette mounting member. --.
Line 34, delete "claim 3" and insert -- claim 1 --.
Lines 39-67, delete in their entirety and insert the following:
-- 5. An apparatus according to claim 4, wherein said swinging member is arranged to be swung in a direction of causing said first tape guiding member to pull out the tape from the cassette before said cassette mounting member begins to move from the first position to the second position.
   6. An apparatus according to claim 5, wherein said swinging member is arranged to be swung in a direction reverse to the direction of causing said first tape guiding member to pull out the tape from the cassette when said cassette mounting member is moving from the first position to the second position. --.

Signed and Sealed this

Eighteenth Day of February, 2003

JAMES E. ROGAN
*Director of the United States Patent and Trademark Office*